(No Model.) 2 Sheets—Sheet 1.
E. & A. J. BOMMER.
SPRING HINGE.
No. 538,891. Patented May 7, 1895.
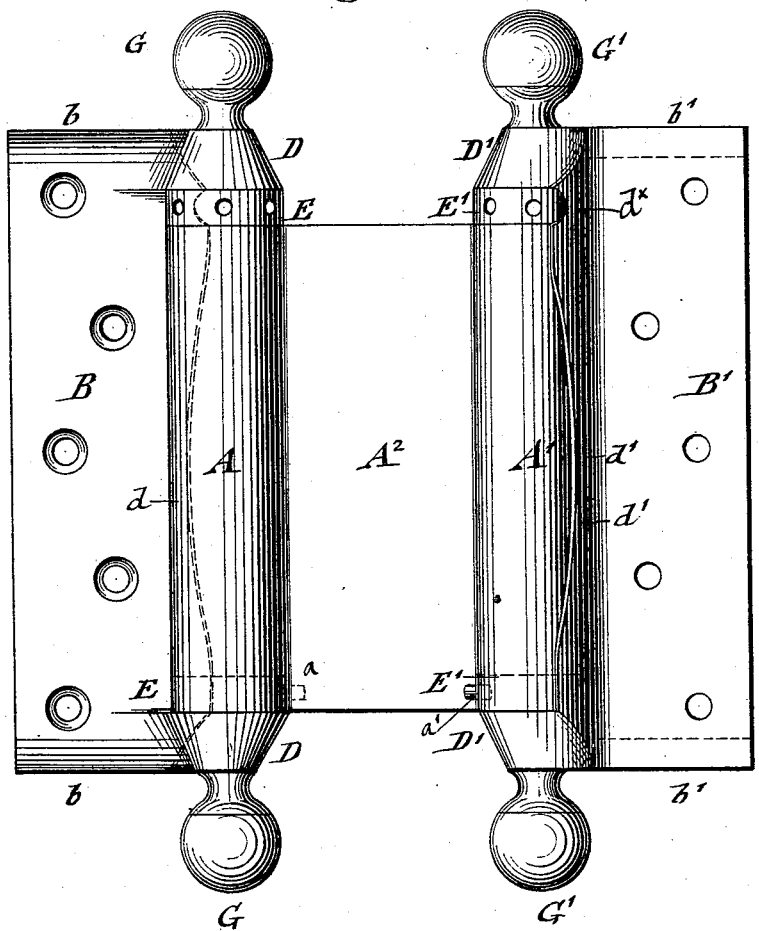
Fig. 1.
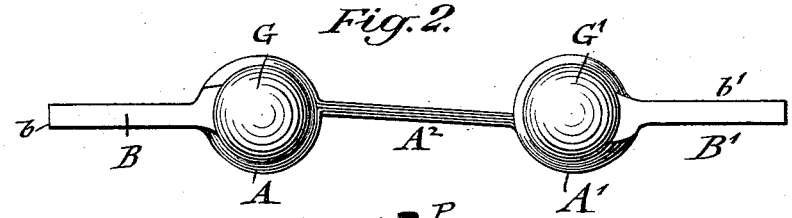
Fig. 2.
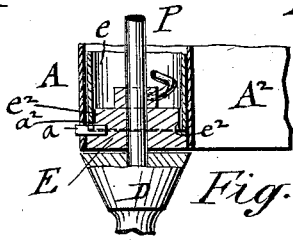
Fig. 2ª.
Witnesses:—
K. R. Brennan
Otto Reiss.
Inventors:
Emil Bommer
and Anthony J. Bommer
by Goepel & Raegener
their Attorneys (No Model.) 2 Sheets—Sheet 2.

E. & A. J. BOMMER.
SPRING HINGE.

No. 538,891. Patented May 7, 1895.

Witnesses:—
K. R. Brennan
Otto Reiss

Inventors:
Emil Bommer and
Anthony J. Bommer
by Goepel & Raegener
their Attorneys

UNITED STATES PATENT OFFICE.

EMIL BOMMER, OF BROOKLYN, AND ANTHONY J. BOMMER, OF VAN PELT MANOR, ASSIGNORS TO BOMMER BROTHERS, OF BROOKLYN, NEW YORK.

SPRING-HINGE.

SPECIFICATION forming part of Letters Patent No. 538,891, dated May 7, 1895.

Application filed December 30, 1893. Serial No. 495,269. (No model.)

*To all whom it may concern:*

Be it known that we, EMIL BOMMER, residing in the city of Brooklyn, and ANTHONY J. BOMMER, residing in Van Pelt Manor, in the county of Kings, State of New York, citizens of the United States, have invented certain new and useful Improvements in Spring-Hinges, of which the following is a specification.

This invention has reference to certain improvements in single and double acting spring-hinges, and more especially to improvements in the larger sizes of spring-hinges, said improvements being designed with the view of reducing the friction of the parts and of increasing the strength and durability of the connection of the spring-barrel with the spring-holders and pintle-sleeves; and the invention consists of certain details of construction, which will be fully described hereinafter and finally pointed out in the claims.

Figure 3:
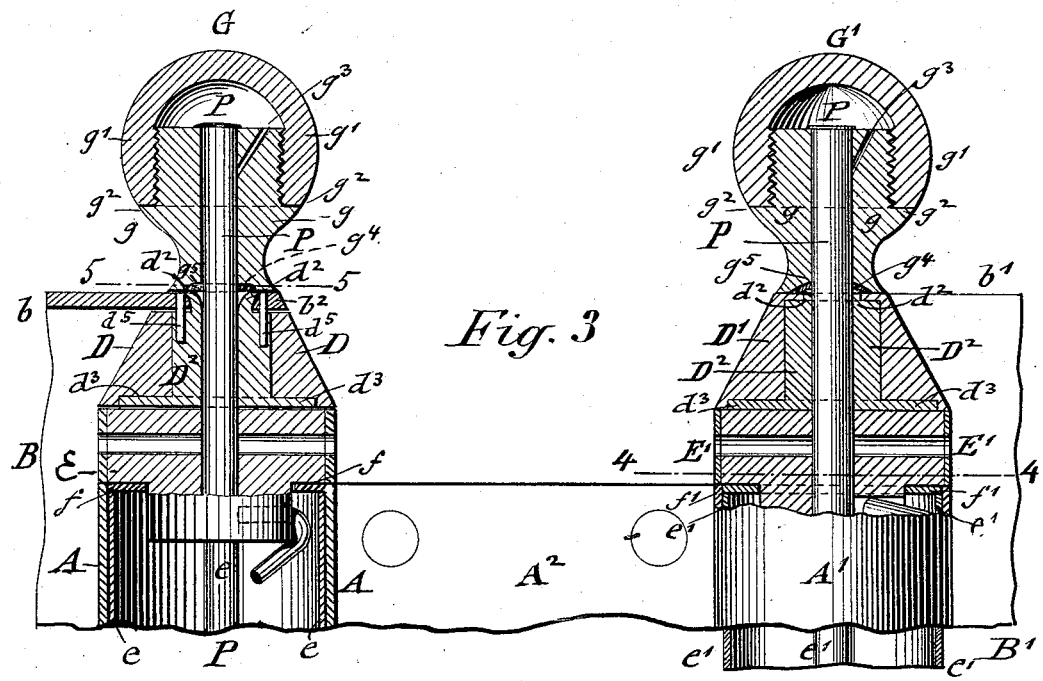
Figure 4:
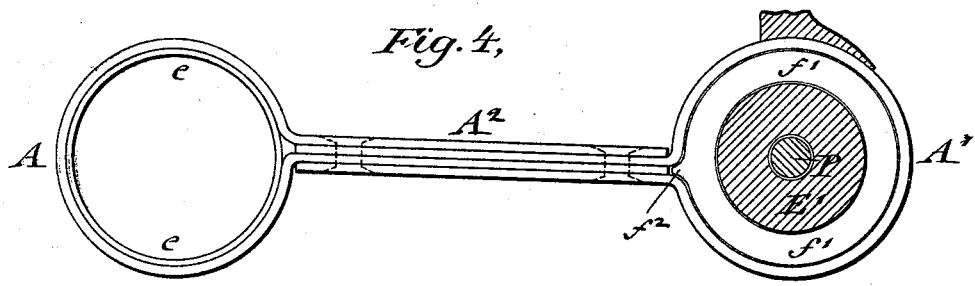
Figure 5:
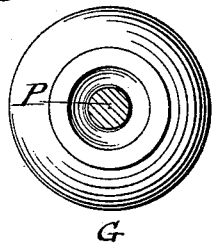
Figure 6:
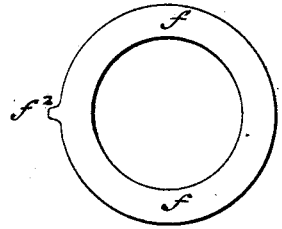
Figure 7:
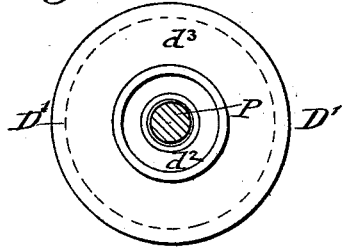

In the accompanying drawings, Figure 1 represents a side elevation of a double spring-hinge made with our improvements. Fig. 2 is a top view of the same. Fig. 2ª is a detail section of the lower part of the reinforced barrel and spring-holder. Fig. 3 is a sectional side elevation of a portion of the spring-hinge, drawn on a larger scale and showing the reinforced barrels, pintle-sleeves, and pintle-tips in section, the left-hand side showing a leaf of sheet metal and the right hand showing a leaf of cast metal and their connections with the pintle-sleeves. Fig. 4 is a plan view of Fig. 3, partly in horizontal section on line 4 4, Fig. 3. Fig. 5 is a bottom view of one of the pintle-tips, the pintle being shown in section on line 5 5, Fig. 3. Fig. 6 is a top view of one of the ring-shaped washers interposed between the spring-barrel and the upper spring-holder, and Fig. 7 is a top view of one of the pintle-sleeves of the leaves.

Similar letters of reference indicate corresponding parts.

Referring to the drawings, A A' represent the spring-barrels and A² the connecting web of a double spring-hinge.

B, B' are the leaves which are, in double acting spring-hinges, attached respectively to the door-frame and the door, and which are made either of sheet metal, preferably sheet-steel, or of brass, bronze or other cast metal of suitable thickness. The leaves B B' are provided with flanges $b$ $b'$ at the upper and lower ends, and with longitudinal stop-flanges $d$ $d'$ that are made integral with the body of the leaves. The stop-flanges $d$ $d'$ extend from the upper pintle-sleeves D D' of the leaves to the lower pintle-sleeves and from the connection between said sleeves, they being provided at one end with a suitable recess $d^\times$ for the tension-pins of the hinge, as shown clearly in Fig. 1. The spring-barrels A A' are preferably made of sheet-metal and integral with the connecting web A², said spring-barrels and web being made four or three-ply, according to the construction shown in Letters Patent granted to Lorenz Bommer, No. 348,312, dated August 31, 1886, or No. 485,366, dated November 1, 1892. The several plies or thicknesses of the web A² are riveted together so that a web of considerable strength is obtained.

The spring-barrels A A' are provided with interior reinforcing sleeves or shells $e$ $e'$ which are preferably made of sheet steel and which are of slightly less length than the spring-barrels A A', so as to permit the insertion of ring-shaped steel-washers $f$ $f'$ between the reinforcing sleeves $e$ $e'$ and the upper movable spring-holders E E'. The interior reinforcing sleeves $e$ $e'$ are made shorter at their lower ends to allow them to rest on the circumferential recess of the lower spring-holders. The steel-washers $f$ $f'$ are provided at one point of their circumference with a small projection $f^2$ which serves to enter into the recess formed at the points where the extension-plates of the spring-barrels are bent in outward direction from the cylindrical body of the barrels, said projection serving to extend into said recess as shown in Fig. 4, and preventing thereby the washer $f$ or $f'$ from changing its position axially by the friction exerted on the same by the upper movable spring-holders. The interior steel-sleeves $e$ $e'$ are of special advantage in large-sized spring-hinges, for reinforcing the spring-barrels of the same, while the washers $f$ $f'$ serve for the purpose of reducing the wear at the contacts of the upper spring holders E E' with the spring-barrels A A', the entire wear being transferred to the harder steel-washers and removed from the softer exterior metal of which the spring-barrels are made. This arrangement renders the spring-barrels of the large-size of spring-hinges much more durable and better adapted for supporting the heavy doors to which they are applied, as it increases considerably the strength and wearing qualities of the hinges.

The spring-holders E E' are made of hard metal, such as steel or cast iron, the upper spring-holders being preferably covered at that part in which the holes for the tension-pins are arranged, with an exterior layer of brass or other metal, for the purpose of improving the appearance of the same. The lower spring-holders E E' are located entirely in the spring-barrels A A' and are secured thereto by means of stationary fastening-pins $a\ a'$ which extend through holes in the barrels, and notches $a^2$ at the lower ends of the reinforcing sleeves $e\ e'$ into a socket-hole of the spring-holders E E'. The lower stationary spring-holders E E' are provided with circumferential recesses $e^2$ for supporting the lower ends of the reinforcing sleeves $e\ e'$ as shown in Fig. 2$^a$. The fastening pins $a\ a'$ engage the notches in the lower ends of the reinforcing sleeves or shells $e\ e'$ and hold the latter rigidly in position in the spring-barrels and on the stationary spring-holders E E'.

The pintle-sleeves D D' of the leaves rest on the spring-holders E E' and are bored out for the purpose of inserting a steel-core $D^2$, which is provided at its upper end with a small nipple $d^2$, and at its base with a disk-shaped enlargement $d^3$ which rests on the top of the spring-holder and takes up the friction with the same so as to protect the faces of the pintle-sleeves D D', which, being made of softer metal than the cores, would otherwise soon show traces of wear. When the leaves B B are made of sheet metal, the pintle-sleeves D D' are made in separate pieces and not integral with the same as when the leaves are of cast metal. The sheet metal leaves are provided with bent-up ears $b^2$ in line with the bent-up flanges $b\ b'$, said ears having central openings for the passage of the pintles. The pintle-sleeves D D' are then interposed between the ears $b^2$ and the pintle-sockets and connected by the nipples $d^2$ on the upper ends of the cores $D^2$ of the pintle-sleeves D D' and by fastening pins $d^5$ with the ears $b^2$, as shown at the left-hand side of Fig. 3. The nipples $d^2$ are passed through the central openings of the ears $b^2$ and enlarged or upset so as to bind firmly on the latter, while the pins $d^5$ prevent the axial shifting of the pintle-sleeves D D' and make a rigid connection between the ears and the pintle-sockets and their steel-cores. The pintle P passes through the spring-barrels A A', spring-holders E E' and pintle-sleeves D D', into tips or terminals G G', which are made of two sections, a shank portion $g$ and a hollow tip-portion $g'$. The shank-portion $g$ is provided with an exterior screw-thread over which the interiorly-threaded tip-portion is screwed until it abuts against the shoulder $g^2$ formed around the threaded shank-portion $g$. The end of the pintle P is enlarged or headed over the end of the shank-portion of the tips G G', said enlarged or headed portions of the pintle holding the parts forming the spring-hinge together. The cavity formed in the hollow tip-portion $g'$ is preferably used for inserting a suitable lubricant, which serves to lubricate the hinge when it is applied to a door, so that it will work immediately without requiring special lubrication. The shank-portion of the tip G or G' is provided with a small channel $g^3$ that leads from its end at a suitable angle of inclination toward the pintle, as shown in Fig. 3, so that the lubricating material is conducted to the pintle and along the same to a washer $g^4$, of felt or other suitable absorbent material, which is placed into a recess $g^5$ in the base of the shank-portion of the tip adjacent to the pintle-sleeve.

The absorbent washer serves for the purpose of retaining the lubricant and preventing it from flowing out between the bottom or neck of the tip and the pintle-sleeve. A small quantity of lubricating material is thus supplied from the tips to the pintle and to the rotating parts of the spring-hinge so as to permit the easy and noiseless working of the same. By supplying from time to time, a small quantity of lubricating material to the pintle-tips, and especially to the upper tips of the spring-hinge, the lubrication of the same can be kept up for some time, as owing to the tight fitting of the parts and the exclusion of air, the lubricant is slowly used up and will therefore last for a considerable length of time without requiring renewal.

The advantages of our improved spring-hinge are, first, that the strength of the same is considerably increased, especially in the larger and heavier sizes of the same for which bronze, brass or other soft metal is used; secondly, that by the introduction of the reinforcing steel-sleeve in the spring-barrels, steel washers between the movable spring-holders and the steel sleeves, and steel-cores in the pintle sleeves, the hinge has a much longer life, as the wear on the contact-faces of the parts is considerably decreased; thirdly, that by the supply of lubricating material to the sectional pintle-tips of the spring-hinge a noiseless and easy motion is imparted to the hinge.

Having thus described our invention, we claim as new and desire to secure by Letters Patent—

1. In a spring-hinge, the combination, with a spring-barrel and its movable spring-holder, of an interior reinforcing sleeve and washers interposed between the ends of said sleeve and the movable spring-holders, substantially as set forth.

2. In a spring-hinge, the combination with the spring-barrel and movable spring-holders, of a reinforcing sleeve of slightly less length than the barrel and washers interposed between the movable spring-holders and the abutting ends of the sleeves, said washers being provided with a projection at one point of the circumference that extends into a recess at the point of connection of the spring-barrel with its extension-plates or web so as to prevent the axial shifting of the washers, substantially as set forth.

3. In a spring-hinge, the combination of the spring-barrel, a reinforcing sleeve or shell on said barrel, and a stationary spring-holder, having a circumferential recess for said sleeve or shell, substantially as set forth.

4. In a spring-hinge, the combination, of the spring-barrel, a reinforcing sleeve or shell for the same, an interior stationary spring-holder, having a circumferential recess for the lower end of the reinforcing sleeve, said sleeve having a notch, and a retaining pin for the spring-holder, engaging the notch of the sleeve or shell, substantially as set forth.

In testimony that we claim the foregoing as our invention we have signed our names in presence of two subscribing witnesses.

EMIL BOMMER.
ANTHONY J. BOMMER.

Witnesses:
PAUL GOEPEL,
K. R. BRENNAN.